US007279247B2

(12) United States Patent
Matarredona et al.

(10) Patent No.: US 7,279,247 B2
(45) Date of Patent: Oct. 9, 2007

(54) CARBON NANOTUBE PASTES AND METHODS OF USE

(75) Inventors: Olga Matarredona, Norman, OK (US); Leandro Balzano, Norman, OK (US); Daniel E. Resasco, Norman, OK (US); Siriporn Jongpatiwut, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 129 days.

(21) Appl. No.: 10/989,124

(22) Filed: Nov. 15, 2004

(65) Prior Publication Data

US 2006/0039848 A1    Feb. 23, 2006

Related U.S. Application Data

(60) Provisional application No. 60/570,213, filed on May 12, 2004, provisional application No. 60/535,273, filed on Jan. 9, 2004.

(51) Int. Cl.
*H01M 4/00* (2006.01)
*C01B 31/02* (2006.01)
*D01F 9/12* (2006.01)

(52) U.S. Cl. ............... 429/44; 423/445 B; 423/447.1; 977/742; 977/948; 977/890

(58) Field of Classification Search ............... 423/461; 502/185; 977/845
See application file for complete search history.

(56) References Cited

U.S. PATENT DOCUMENTS 3,746,657 A    7/1973 Miller et al.

(Continued)

FOREIGN PATENT DOCUMENTS

EP    0 945 402 A1    9/1999

(Continued)

OTHER PUBLICATIONS

Roberto Giordano, Philippe Serp, Philippe Kalck, Yolande Kihn, Joachim Schreiber, Christiane Marhic, Jean-Luc Duvail. Preparation of Rhodium Catalysts Supported on Carbon Nanotubes by a Surface Mediated Organometallic Reaction, European Journal of Inorganic Chemistry vol. 2003, No. 4, pp. 610-617, Feb. 2003.*

(Continued)

*Primary Examiner*—Stuart L. Hendrickson
*Assistant Examiner*—Daniel C. McCracken
(74) *Attorney, Agent, or Firm*—Dunlap, Codding & Rogers, P.C.

(57) ABSTRACT

Dispersable pastes comprising single-walled carbon nanotubes (SWNT) in water or in an organic solvent are prepared. The method of preparing the dispersable pastes comprises in general the following steps: a) removal of the catalyst used during the synthesis of SWNT; b) while the SWNT are still wet, addition of the appropriate amount of solvent, in a solvent/SWNT ratio which preferably varies between 30:1 and 100:1, depending on the desired viscosity of the paste; and c) high-energy horn sonication with a dismembrator probe.

The resulting pastes are suitable for easy redispersion in solvents and incorporation in various matrices such as polymers. They are also suitable to be impregnated with metal precursors such as noble metal compounds for example, Pt. Appropriate drying and thermal treatments of the impregnated material produce metal-SWNT composites in which small metal clusters can be uniformly dispersed over the nanotube surface. These metal-SWNT composites may find applications as catalysts as well as electrodes for fuel cells, batteries, and capacitors.

19 Claims, 8 Drawing Sheets

U.S. PATENT DOCUMENTS

| | | | |
|---|---|---|---|
| 4,456,694 A | 6/1984 | Blaskie et al. | |
| 4,574,120 A | 3/1986 | Thompson | |
| 4,663,230 A | 5/1987 | Tennent | |
| 5,165,909 A | 11/1992 | Tennent et al. | |
| 5,227,038 A | 7/1993 | Smalley et al. | |
| 5,300,203 A | 4/1994 | Smalley | |
| 5,405,996 A | 4/1995 | Suzuki et al. | |
| 5,424,054 A | 6/1995 | Bethune et al. | |
| 5,482,601 A | 1/1996 | Ohshima et al. | |
| 5,500,200 A | 3/1996 | Mandeville et al. | |
| 5,543,378 A | 8/1996 | Wang | |
| 5,556,517 A | 9/1996 | Smalley | |
| 5,560,898 A | 10/1996 | Uchida et al. | |
| 5,578,543 A | 11/1996 | Tennent et al. | |
| 5,587,141 A | 12/1996 | Ohshima et al. | |
| 5,591,312 A | 1/1997 | Smalley | |
| 5,603,907 A | 2/1997 | Grochowski | |
| 5,641,466 A | 6/1997 | Ebbesen et al. | |
| 5,648,056 A | 7/1997 | Tanaka | |
| 5,695,734 A | 12/1997 | Ikazaki et al. | |
| 5,698,175 A | 12/1997 | Hiura et al. | |
| 5,707,916 A | 1/1998 | Snyder et al. | |
| 5,744,235 A | 4/1998 | Creehan | |
| 5,747,161 A | 5/1998 | Iijima | |
| 5,753,088 A | 5/1998 | Olk | |
| 5,773,834 A | 6/1998 | Yamamoto et al. | |
| 5,780,101 A | 7/1998 | Nolan et al. | |
| 5,814,290 A | 9/1998 | Niu et al. | |
| 5,877,110 A | 3/1999 | Snyder et al. | |
| 5,965,267 A | 10/1999 | Nolan et al. | |
| 5,981,445 A * | 11/1999 | Kirchnerova et al. | 505/440 |
| 5,985,232 A | 11/1999 | Howard et al. | |
| 5,997,832 A | 12/1999 | Lieber et al. | |
| 6,221,330 B1 | 4/2001 | Moy et al. | |
| 6,312,303 B1 | 11/2001 | Yaniv et al. | |
| 6,333,016 B1 | 12/2001 | Resasco et al. | |
| 6,346,189 B1 | 2/2002 | Dai et al. | |
| 6,401,526 B1 | 6/2002 | Dai et al. | |
| 6,413,487 B1 | 7/2002 | Resasco et al. | |
| 6,426,134 B1 | 7/2002 | Lavin et al. | |
| 6,432,866 B1 | 8/2002 | Tennent et al. | |
| 6,479,939 B1 | 11/2002 | Yaniv et al. | |
| 6,573,643 B1 | 6/2003 | Kumar et al. | |
| 6,580,225 B2 | 6/2003 | Yaniv et al. | |
| 6,596,187 B2 | 7/2003 | Coll et al. | |
| 6,599,961 B1 | 7/2003 | Pienkowski et al. | |
| 6,656,339 B2 | 12/2003 | Talin et al. | |
| 6,664,722 B1 | 12/2003 | Yaniv et al. | |
| 6,699,457 B2 | 3/2004 | Cortright et al. | |
| 6,761,870 B1 | 7/2004 | Smalley et al. | |
| 2001/0031900 A1 | 10/2001 | Margrave et al. | |
| 2002/0127169 A1 | 9/2002 | Smalley et al. | |
| 2002/0160111 A1* | 10/2002 | Sun et al. | 427/248.1 |
| 2002/0165091 A1 | 11/2002 | Resasco et al. | |
| 2003/0077515 A1 | 4/2003 | Chen et al. | |
| 2003/0089893 A1 | 5/2003 | Niu et al. | |
| 2003/0147802 A1 | 8/2003 | Smalley et al. | |
| 2003/0175200 A1 | 9/2003 | Smalley et al. | |
| 2003/0180526 A1 | 9/2003 | Winey et al. | |
| 2004/0009346 A1 | 1/2004 | Jang et al. | |
| 2004/0028859 A1 | 2/2004 | LeGrande et al. | |
| 2004/0038556 A1* | 2/2004 | French et al. | 438/800 |
| 2005/0002851 A1* | 1/2005 | McElrath et al. | 423/447.3 |

FOREIGN PATENT DOCUMENTS

| | | |
|---|---|---|
| EP | 01 93 9821 | 6/2004 |
| WO | WO97/09272 | 3/1997 |
| WO | WO98/39250 | 9/1998 |
| WO | WO98/42620 | 10/1998 |
| WO | WO 00/17102 | 3/2000 |
| WO | PCT/US00/15362 | 10/2000 |
| WO | WO 00/73205 | 12/2000 |
| WO | WO 03/048038 | 6/2003 |
| WO | PCT/US02/23155 | 7/2003 |
| WO | WO 2004/001107 | 12/2003 |
| WO | PCT/US03/019664 | 3/2004 |

OTHER PUBLICATIONS

Rajdip Bandyopadhyaya, Einat Nativ-Roth, Oren Regev, Rachel Yerushalmi-Rozen, Stabilization of Individual Carbon Nanotubes in Aqueous Solutions, Nano Letters vol. 2, No. 1, pp. 25-28, 2002. □□10.1021/nl010065f S1530-6984(01)00065-0.*

Zong-Jian Liu, Zhude Xu, Zhong-Yong Yuan, Deyi Lu, Weixiang Chen, Wuzong Zhou, Cyclohexanol dehydrogenation over Co/carbon nanotube catalysts and the effect of promoter K on performance, Catalysis Letters vol. 72, No. 3-4, pp. 203-206, 2001.*

U.S. Appl. No. 60/101,093, filed Sep. 18, 1998, Smalley et al.

Alvarez, et al., "Synergism of Co and Mo in the catalytic production of single-wall carbon nanotubes by decomposition of CO", *Elsevier Science Ltd.*, Carbon 39 (2001), pp. 547-558.

Anderson et al., "50 nm Polystyrene Particles via Miniemulsion Polymerization", Macromolecules, American Chemical Society, vol. 35, pp. 574-576, 2002.

Bandow et al., "Effect of the Growth Temperature on the Diameter Distribution and Chirality of Single-Wall Carbon Nanotubes", *The American Physical Society*, Physical Review Letters, vol. 80, No. 17, (1998), pp. 3779-3782.

Bethune et al. "Cobalt-Catalysed Growth of Carbon Nanotubes with Single-Atomic-Layer Walls", Letters to Nature, vol. 363, pp. 605-607, Jun. 17, 1993.

Bower et al., "Deformation of Carbon Nanotubes in Nanotube-Polymer Composites", Applied Physics Letters, vol. 74, No. 22, pp. 3317-3319, May 31, 1999.

V. Brotons et al., "Catalytic influence of bimetallic phases for the synthesis of single-walled carbon nanotubes", Journal of Molecular Catalysis, A: Chemical, vol. 116, pp. 397-403, Dec. 16, 1997.

Cadek et al., "Mechanical and Thermal Properties of CNT and CNF Reinforced Polymer Composites", Structural and Electronic Properties of Molecular Nanostructures, American Institute of Physics, pp. 562-565, 2002.

Cassell et al., "Large Scale CVD Synthesis of Single-Walled Carbon Nanotubes", J. Phys. Chem. B., American Chemical Society, vol. 103, pp. 6484-6492, 1999.

Chattopadhyay, et al., "A Route for Bulk Separation of Semiconducting from Metallic Singel-Wall Carbon Nanotubes", Journal of American Chemical Society, vol. 125, No. 11, pp. 3370-3375, 2003.

Chaturvedi et al., "Properties of pure and sulfided NiMo04 and CoMo04 catalysts: TPR, XANES and time-resolved XRD studies", Database Accession No. EIX99044490981 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, 1998, Mrs. Warrendale, PA, USA.

Che et al., "Chemical Vapor Deposition Based Synthesis of Carbon Nanotubes and Nanofibers Using a Template Method", Chemical Mater., vol. 10, pp. 260-267, 1998.

Chen et al., "Bulk Separative Enrichment in Metallic or Semiconducting Single-Walled Carbon Nanotubes", Nano Letters, 2003 vol. 3, No. 9, 1245-1249.

Chen et al., "Dissolution of Full-Length Single-Walled Carbon Nanotubes", J. Phys. Chem. B, vol. 105, pp. 2525-2528, 2001.

Chen et al., "Growth of carbon nanotubes by catalytic decompositon of $CH_4$ or CO on a Ni-MgO catalyst", Carbon vol. 35, No. 10-11, pp. 1495-1501, 1997.

Cheng et al.,"Bulk Morphology and Diameter Distribution of Single-Walled Carbon Nanotubes Synthesized by Catalytic Decomposition of Hydrocarbons", Chemical Physics Letters, vol. 289, pp. 602-610, Jun. 19, 1998.

Cheng et al., "Large-Scale and Low-Cost Synthesis of Single-Walled Carbon Nanotubes by the Catalytic Pyrolysis of Hydrocarbons", Applied Physics Letters, vol. 72, No. 25, pp. 3282-3284, Jun. 22, 1998.

Dai et al., "Single-Wall Nanotubes Produced By Metal-Catalyzed Disproportionation of Carbon Monoxide", Chemical Physics Letters, vol. 260, pp. 471-475, Sep. 27, 1996.

Database, Accession No. 1999-366878, Cano, "Canon KK", XP-002149235, May 25, 1999.

De Boer et al., "The cobalt-molybdenum interaction in CoMo/SiO$_2$ catalysts: A CO-oxidation study", *Elsevier Science Ltd.*, Solid State Ionics 63-65 (1993), pp. 736-742.

Deng et al., "Hybrid Composite of Polyaniline Containing Carbon Nanotube", Chinese Chemical Letters, vol. 12, pp. 1037-1040, 2001.

Fonseca et al., "Synthesis of single-and multi-wall carbon nanotubes over supported catalysts", Applied Physics A, vol. 67, pp. 11-22, 1998.

Franco et al., "Electric and magnetic properties of polymer electrolyte/carbon black composites", Solid State Ionics 113-115, pp. 149-160, 1998.

Gaspar et al., "The influence of Cr precursors in the ethylene polymerization on Cr/SiO$_2$ catalysts", Applied Catalysis A: General, vol. 227, pp. 240-254, 2002.

Gong et al., "Surfactant-Assisted Processing of Carbon Nanotube/Polymer Composites", Chemical Material, vol. 12, pp. 1049-1052, 2000.

Govindaraj et al., "Carbon structures obtained by the disproportionation of carbon monoxide over nickel catalysts", Materials Research Bulletin, vol. 33, No. 4, pp. 663-667, 1998.

Hafner et al., "Catalytic growth of single-wall carbon nanotubes from metal particles", Chemical Physics Letters, vol. 296, pp. 195-202, 1998.

Hamon et al., "End-group and defect analysis of soluble single-walled carbon nanotubes", Chemical Physics Letters, vol. 347 pp. 8-12, 2001.

Hernadi et al., "Catalytic synthesis of carbon nanotubes using zeolite support", Elsevier Science Inc. 1996.

Hwang et al., "Carbon nanotube reinforced ceramics", Journal of Materials Chemistry, vol. 11, pp. 1722-1725, 2001.

Hyperion Catalysis International Website; http://www.fibrils.com/esd.htm ;"Unique Slough Resistant SR™ Series ESD Thermoplastic Product Line Offers Reduced Particle Contamination For Demanding Electronic Applications," and Hyperion Homepage http://www.fibrils.com, Nov. 19, 2001.

Iijima, "Helical Microtubules of Graphitic Carbon", Letters to Nature, vol. 354, pp. 56-58, Nov. 7, 1991.

Iijima et al., "Single-Shell Carbon Nanotubes of 1-nm Diameter", Letters to Nature, vol. 363, pp. 603-605, Jun. 17, 1993.

Ivanov et al., "The Study of Carbon Nanotubules Produced by Catalytic Method", Chemical Physics Letters, vol. 223, pp. 329-335, 1994.

Jin et al., "Alignment of Carbon nanotubes in a polymer matrix by mechanical stretching", Applied Physics Letters, vol. 73, No. 9, pp. 1197-1199, Aug. 31, 1998.

Journet et al., "Large-Scale Production of Single-Walled Carbon Nanotubes by the Electric-Arc Technique", Letters to Nature, vol. 338, pp. 756-758, Aug. 21, 1997.

Kitiyanan et al., "Controlled production of single-wall carbon nanotubes by catalytic decomposition of CO on bimetallic Co-Mo catalysts", Chemical Physics Letters, vol. 317, pp. 497-503, Feb. 4, 2000.

Krishnankutty et al., "The Effect of Copper on the Structural Characteristics of Carbon Filaments Produced from Iron Catalyzed Decomposition of Ethylene," Catalysts Today, vol. 37, pp. 295-307, 1997.

Landfester et al., "Miniemulsion polymerization", Jun. 4, 2003, http://www.mpikg-golm.mpg.de/kc/landfester/, 1-22.

Landfester, "Polyreactions in Miniemulsions", Macromol. Rapid Commun., vol. 22, No. 12, pp. 896-936, 2001.

Landfester, "The Generation of Nanoparticles in Miniemulsions", Advanced Materials, vol. 13, No. 10, pp. 765-768, May 17, 2001.

Li et al., "Large-Scale Synthesis of Aligned Carbon Nanotubes", Science, vol. 274, pp. 1701-1703, Dec. 6, 1996.

McCarthy et al., "A Microscopic and Spectroscopic Study of Interactions between Carbon Nanotubes and a Conjugated Polymer", J. Phys. Chem. B, vol. 106, pp. 2210-2216, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, 2001.

Patent Abstracts of Japan, vol. 1996, No. 12, Dec. 26, 1996, and JP 0 8 198611 A (NEC CORP), Aug. 6, 1996, Abstract.

Pompeo et al., "Water Solubilization of Single-Walled Carbon Nanotubes by Functionalization with Glucosamine", Nano Letters, American Chemical Society, vol. 2, No. 4, pp. 369-373, 2002.

Qian et al., "Load transfer and deformation mechanisms in carbon nanotube-polystyrene composites",Applied Physics Letters, American Institute of Physics, vol. 76, No. 20, pp. 2868-2870, May 15, 2000.

Razavi, "Metallocene catalysts technology and environment", Chemistry 3, pp. 615-625, 2000.

Rinzler et al., "Large-Scale Purification of Single-Wall Carbon Nanotubes: Process, Product, and Characterization," Applied Physics A, vol. 67, pp. 29-37, 1998.

Sears et al., "Raman scattering from polymerizing styrene. I. Vibrational mode analysis $^a$)", J. Chem. Phys., vol. 75, No. 4, pp. 1589-1598.

Shaffer et al., "Fabrication and Characterization of Carbon Nanotube/Poly (vinyl alcohol) Composites**", Advanced Materials, vol. II, No. 11, pp. 937-941, 1999.

Tohji et al., "Purification Procedure for Single-Wall Nanotubes", J. Phys. Chem. B, vol. 101, pp. 1974-1978 (1997).

Thess et al., "Crystalline Ropes of Metallic Carbon Nanotubes", Science, vol. 273, pp. 483-487, Jul. 26, 1996.

Tiarks et al., "Encapsulation of Carbon Black by Miniemulsion Polymerization", Macromol. Chem. Phys., vol. 202, pp. 51-60, 2001.

Tiarks et al., "Silica Nanoparticles as Surfactants and Fillers for Latexes Made by Miniemulsion Polymerization", Langmuir, American Chemical Society, vol. 17, pp. 5775-5780, 2001.

Willems et al., "Control of the outer diameter of thin carbon nanotubes synthesized by catalytic decomposition of hydrocarbons", Chemical physics Letters, vol. 317, pp. 71-76, Jan. 28, 2000.

Yakobson et al.; "Fullerene Nanotubes: $C_{1,000,000}$ and Beyond," American Scientist, vol. 85, pp. 324-337, Jul.-Aug. 1997.

Zhao, et al., "Chromatographic Purification and Properties of Soluble Single-Walled Carbon Nanotubes", American Chemical Society, Page Est: 4.1, pp. A-E, Feb. 22, 2001.

Zhu et al., "Direct Synthesis of Long Single-Walled Carbon Nanotube Strands", Science, vol. 296, pp. 884-886, May 13, 2002.

\* cited by examiner

CARBON NANOTUBE PASTES AND METHODS OF USE

CROSS-REFERENCE TO RELATED APPLICATIONS

This application claims the benefit under 35 U.S.C. 119(e) of U.S. Provisional Application Ser. No. 60/535,273, filed Jan. 9, 2004 and U.S. Provisional Application Ser. No. 60/570,213, filed May 12, 2004, the contents of which are hereby expressly incorporated by reference herein in their entirety.

STATEMENT REGARDING FEDERALLY SPONSORED RESEARCH OR DEVELOPMENT

Not applicable.

BACKGROUND OF THE INVENTION

Since the discovery of single-walled carbon nanotubes (SWNTs), research on applications of these unique materials has increased at a rapid rate. The large variety of SWNT-based materials parallels the large number of potential commercial applications, which include polymeric composites, field emission displays, electrical capacitors, and thermal management materials. Accordingly, a number of different techniques have been proposed to manufacture SWNT-based materials. The current demand of these materials is mostly related to research activities. Several factors are responsible for the observed delay in transferring these activities from the labs into the commercial applications. First, the high cost of SWNTs at this stage of production has limited the amounts that can be made available for large-scale development. Second, the difficulties in handling and dispersing these materials that are inherent to SWNTs make their incorporation in useful matrices a challenge. The incompatibility of SWNTs with most typical solvents limits their effective handling and widespread use, since, when placed in water or most organic solvents, nanotubes generally quickly fall out of suspension even after strong sonication. Third, due to the extraordinary properties of carbon nanotubes, many new applications are appearing everyday and each application may require a different handling and dispersion procedure. Interestingly, while only a very small amount of nanotubes may be sufficient to achieve greatly improved properties in some applications, in other applications the concentration SWNTs used may need to be much higher.

Even though individual SWNTs have well-defined ideal structures, they bundle-up in ropes of different sizes, depending on the particular methods of synthesis and handling chosen by the manufacturers. The few commercial sources of SWNTs have made their product available in a variety of forms. For example, SWNTs produced by arc discharge and laser ablation have been commercialized as a soot of varying particle sizes containing different concentrations of residual catalyst. In other cases, SWNTs have been commercialized as a suspension in liquid media. The first attempts of solubilizing nanotubes made use of the possibility of shortening the SWNT by acid attack in concentrated sulfuric-nitric mixtures. These aggressive treatments were shown, however, to introduce a significant number of defects in the SWNTs along with amorphous carbon that is generally undesirable. Other products introduced external elements to facilitate the dispersion. They have included chemical modification of the nanotubes and the use of wetting agents such as surfactants.

The most extended functionalization method is the one developed by Haddon et al., in which the nanotubes are dissolved in chloroform, benzene, toluene or other organic solvents after oxidation and subsequent derivatization with thionylchloride and octadecylamine. Alternative approaches make use of the partial oxidation of SWNTs, followed by sidewall reactions with fluorine, alkanes, diazonium salts, or by ionic functionalization. The main disadvantage of these methods is the inevitable distortion of the original structure and chemistry of the nanotubes.

Other groups have opted for the attachment of soluble polymers to SWNTs by various methods. For example, O'Connell et al., developed a non-covalent association of SWNTs with linear polymers such as polyvinyl pyrrolidone and polystyrene sulfonate. The intimate interaction that results between the polymers and the SWNTs result in an increased suspendability of the nanotubes in water. A similar method has been developed at Zyvex, although in this case, as proposed by these inventors, the functionalization does not involve the nanotube wrapping by the polymer, but rather a noncovalent bond between a conjugated polymer and the nanotube. It is proposed that the interaction between the polymer backbone and the nanotubes is due to $\pi$-$\pi$ bonding. Although this particular solubilization seems to be effective for the enhancement of the nanotubes solubility, times of at least 30 minutes are required for the re-dispersion of these materials and a limited number of "selected" organic solvents can be used.

Surfactants have also been extensively used to obtain concentrated nanotube suspensions. Intensive work at various universities has demonstrated the effectiveness of different surfactants in dispersing single-walled nanotube materials. There are a number of publications reporting the use of sodium dodecylsulfate, sodium dodecylbezenesulfonate and TRITON X among others. However, due to the strong Van der Waals interactions between the nanotube surface and the hydrophobic tails of the surfactant molecules, the removal of the surfactant from the nanotubes becomes very problematic. Moreover, the maximum concentrations of SWNTs achieved in these suspensions are exceedingly low.

Smalley et al., have proposed to use alewives as a redispersable SWNT product. This product is produced by treatment in liquid superacids such as oleum (a highly concentrated sulfuric acid) and other corrosive liquids. The main disadvantage of this method is the need to handle hazardous liquids. In addition, this type of aggregate cannot be formed in anhydrous media, whereas the product of the present invention can be made in either aqueous or non-aqueous media as described in more detail below.

It is clearly apparent that a method to produce readily soluble SWNTs would be greatly advantageous for the development of applications of SWNT-based materials. It is to this end that the present invention is directed.

DETAILED DESCRIPTION OF THE INVENTION

Figure 1:
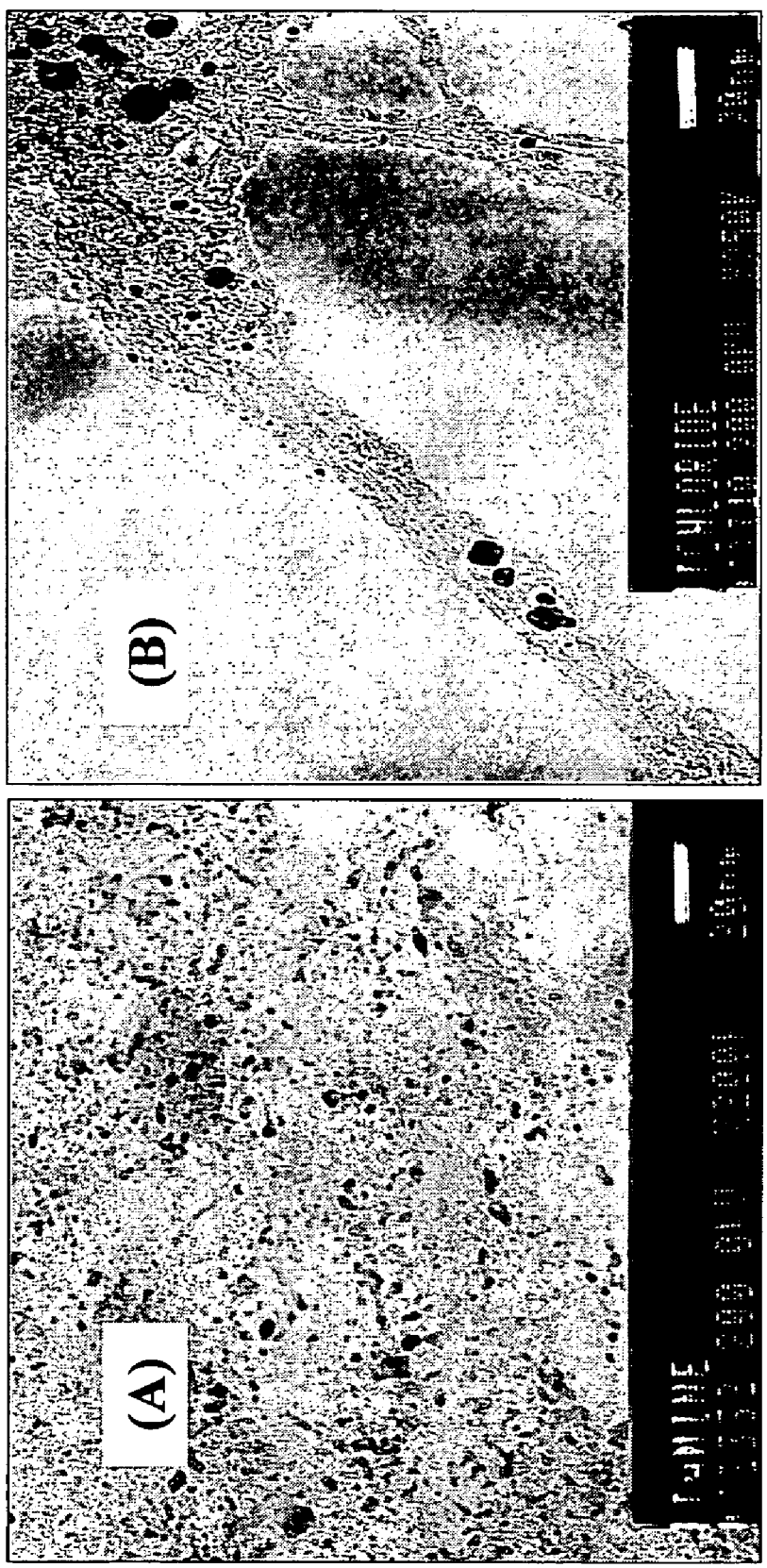
FIG. 1. TEM images of the Pt/SWNT samples, Pt loading=10 wt %. Sample (A) prepared from Pt tetra-amine precursor and sample (B) prepared from Pt hexa-chloro precursor.

The present invention provides methods and compositions which overcome disadvantages of previous methods of treating SWNTs and providing SWNTs in a form more usable for commercial applications. In particular, the present invention contemplates a dispersable SWNT paste which can have SWNT concentrations of up to and in excess of 3 wt %. This SWNT paste can be stored for long periods of time and then re-dispersed and incorporated into other systems, such as polymers, organic solutions, aqueous solutions, and electrodes. This SWNT paste (also referred to herein as a SWNT dispersion or carbon nanotube dispersion) comprises a homogeneous suspension of single-walled carbon nanotubes in water, or other solvents, and which remains stable (without precipitation or phase separation) without the aid of chemical modification of the nanotubes, nor the addition of additives or external chemical agents.

In one embodiment, the invention comprises a novel dispersable SWNT paste comprising highly-concentrated single-walled carbon nanotubes in water. The SWNT paste is prepared by introducing single-walled carbon nanotubes into water and sonicating the mixture with a horn dismembrator at a high energy and frequency. The SWNT paste is formed by incorporating water into the purified single-walled carbon nanotubes until supersaturation occurs with the aid of energetic sonication. For a given set of preparation conditions, the concentration and viscosity of the SWNT paste is dependent on the initial amount of SWNTs, the volume of water initially added, and the sonication time and energy. Thinner pastes (lower viscosities) are formed using lower sonication times and higher initial amounts of water added. The SWNT paste that results enables the incorporation of carbon nanotubes into other systems, such as polymer solutions, surfactant solutions or organic solvents because of the enhanced dispersability of the nanotube paste.

Because the SWNT paste has a high viscosity, it is easy to handle and process. The invention also enables the formation of SWNT paste in other organic solvents, such as xylenes, chlorobenzene, acetone, n-methyl pyrrolidone (NMP), di-chlorobenzene, and alcohols such as iso-propanol.

The novel SWNT paste of the present invention exhibits a number of important advantages over other forms of SWNTs. For example:

1. The SWNT paste is stable over time on the shelf. Even after several weeks left unstirred, no phase separation was observed.
2. The SWNT paste has a homogeneous composition.
3. Redispersion of the SWNT paste in surfactants or organic solvents requires less energy consumption and time. Because water molecules surround the bundles, this material can be easily incorporated into wet systems.
4. The increased surface area of the SWNTs in the SWNT paste compared to that of dried nanotubes makes it more suitable for applications in which the exposed surface area is crucial.
5. Use of toxic organic solvents such as toluene, THF or DMF can be avoided when incorporating nanotubes into a water-soluble system.
6. Handling small quantities of SWNTs (milligrams or below) becomes less problematic.
7. The SWNT paste can be applied as a coating on flat surfaces in the form of a thick ink (paint-like).
8. Spills during transportation and handling can be avoided due to the high viscosity of the SWNT paste.

In a second embodiment of the invention, the SWNT paste can be used as a precursor for the production of metal/SWNT composites. For example, the properties of SWNTs show great potential for improvement of fuel cell electrodes' performances. Nanotubes can stabilize high Pt dispersions (or other metals), increase electronic conductivity in the electrodes, improve gas transport in the electrodes' reactive layers, and decrease peroxides attack of the ionomer.

Although several techniques have been employed previously to deposit Pt particles on carbon nanotubes, none of the existing methods is as simple and effective as the method described herein. A previously used method is the application of prior oxidation of the nanotubes making use of nitric acid or similar oxidants. For example, the method developed by Lordi et al., relies on the surface oxidation of single-walled carbon nanotubes prior to the deposition of the Pt particles refluxing a Pt salt in dilute ethylene glycol. Similarly, the work described by Li et al., uses the aid of chemical modification of the multi-walled carbon nanotubes by means of $HNO_3/H_2SO_4$ attack, before the ion exchange of the Pt ions. However, it is well known that the acid attack causes the destruction of nanotubes beginning from the tips and generating amorphous carbon. In addition to that, the technique employed by Li et al., teaches away from the present invention. In the method described in Li et al., the range of pH used is such that the surface charge is of the same sign as that of the charge of the metal precursor ions. Although unrelated to the preparation of fuel cell catalysts, an interesting method developed Govindaraj et al., makes use of vacuum vapor deposition of Pt salts for the intercalation of Pt nanowires in the capillaries of SWNTs. The complexity of this method relies on the high vacuum atmosphere along with the very high temperatures necessary for the decomposition of the Pt salts.

Thus, the present invention represents a significant advantage with respect to other Pt-SWNT depositions proposed previously. The most important advantage is that no chemical modification (e.g. functionalization) of the nanotubes is required, thus, unnecessary destruction of the nanotubes is avoided. At the same time, the time and effort consumed by the long nanotube pretreatment steps are minimized.

EXAMPLES

Each of the embodiments summarized above is described below in greater detail and with the help of examples. The invention is however not to be limited to the examples provided herein. The following examples provide details of the preparation of the paste and illustrate the type of applications in which this material exhibits clear advantages over other forms of SWNT materials. The SWNT material used in the examples provided herein were obtained by a catalytic method (CoMoCAT™ synthesis), which we have developed and results in high selectivities for SWNT formation which employs a Co—Mo catalyst (shown for example in U.S. Pat. No. 6,333,016 and U.S. Pat. No. 6,413,487, each of which is hereby expressly incorporated by reference herein in its entirety). The carbon product obtained in this method depends on the Co:Mo ratio and on the catalyst treatments that precede nanotube growth. Adjustment of these parameters allows for fine control over the form of the active catalyst clusters, and therefore of the nanotube structures. The nanotubes used in the present examples have an average diameter of 0.8 nm. The present invention is not limited to the use of nanotubes formed by this method however or to nanotubes having this average diameter.

The CoMoCAT™ synthesis was conducted in a fluidized bed reactor over a silica-supported bimetallic CoMo catalyst, prepared from cobalt nitrate and ammonium heptamolybdate precursors. The total metallic loading in the catalyst was 2 wt. %, with a Co:Mo molar ratio of 1:3. Before exposure to the CO feedstock, the catalyst was heated to 500° C. in a flow of gaseous $H_2$, and further heated to 850° C. in flowing He. Then the CO disproportionation was carried out under a flow of pure CO at 5 atm total pressure. The SWNTs grown by this method remained mixed with the spent catalyst, containing the silica support and the Co and Mo species. The silica and metals were eliminated by two different purification methods.

In order to determine the influence of the different purification treatments on the surface chemistry of SWNTs, two different methods, one basic and one acidic, were used and compared in the silica-removal process. Prior to the removal of the silica, the raw material was placed in an oven at 250° C. for 10 hours to oxidize the Co and Mo species remaining in the product, followed by bath-sonication in hydrochloric acid (38% pure) to remove the metal oxides. The solid material was then thoroughly rinsed in nanopure water until the pH returned to neutral, as tested with a pH-indicator paper. Once the metals had been removed, the silica support was removed by dissolution, either using an acidic or a basic treatment. In the first case, the composite was ground and added to hydrofluoric acid (~33% pure) in an ultrasonication bath (Cole Parmer, 168W, 50-60 KHz) for 3 hours. The hydrofluoric acid was removed by repeatedly washing with nanopure water until the pH returned to neutral. Similarly, in the basic method, a second batch of composite was put in contact with 10 M sodium hydroxide for 3 hours. Again, several rinses were applied until a neutral pH was reached.

Example 1

Method of Preparation of the Dispersable SWNT Paste in Aqueous Media

The SWNTs purified according to the method described above were recovered in a glass container while still wet and additional deionized water was added. Very high-energy horn-sonication (using a Fisher 550 Sonic Dismembrator) was then applied to the solution for a determined period of time. In this example, the sonication time was of 1 min., but similar results were obtained in a time range of from 10 seconds to 5 minutes. The optimum sonication time depends on the total amount of material being processed, and can be determined by observation of the viscosity of the slurry. The horn-sonicator is preferably at least 20 KHz of frequency and operates in a range of 60W to 600W of maximum energy. The combination of energetic sonication and warming up of the solution gives the suspension the consistency of a black paste (which might also be described as a cream or a slurry). The present method differs from previous sonication methods in at least one important way in that the SWNTs which are sonicated have a wet condition prior to initiation of the sonication process.

Example 2

Method of Preparation of the Dispersable SWNT Paste in Organic Media

The SWNTs purified according to the method described above were recovered in a glass container while still wet and washed by filtration with an organic solvent until the residual water was completely removed. The resulting SWNT-solvent paste was transferred to a glass container where additional organic solvent was added, providing a SWNT/solvent ratio within a 100:1-30:1 range. Energetic horn-sonication was applied following the procedure described above until a thick paste was formed. In this example, the nanotubes bundles are surrounded by organic solvent molecules instead of water, making this paste ready to re-disperse in any organic medium.

Example 3

Method of Preparation of a Pt/SWNT Catalyst

The PZC (point of zero charge) of the nanotubes varies with the purification method. The changes in PZC can be explained taking into account that proton adsorption occurs on the nanotube surface when the pH of the surrounding medium is below th PZC. By contrast, release of protons from the surface occurs when the pH is higher than the PZC. By contrast, release of protons from the surface occurs when the pH is higher than the PZC. If the concentration of $OH^-$ is further increased, negative charges are generated on the surface. Depending upon the electrical charge of metal precursor ion of interest, the pH is adjusted to generate charges of opposite sign on the nanotubes surface. Then, an aqueous solution of metal precursor is added to the gel. Because of the electrostatic attraction between the charged nanotubes and the precursor ions, the metal rapidly adsorbs onto the nanotube surface. The mixture is then sonicated to open up bundles, maximizing the surface area and allowing the metal ions to diffuse and deposit on the nanotubes walls achieving a better metal dispersion.

The impregnation of the support material with the Pt precursor takes place using a wet SWNT paste, which is different from typical carbon-supported Pt catalyst preparations in which the metal precursor is added onto a dry support. The metal-impregnated paste is then preferably freeze-dried to remove the water. The process of freeze-drying, also known as lyophilization, consists of removing water from a product in two steps, first by sublimation and then by desorption. As a result of the freeze-drying process the surface area of the SWNT paste is preserved. If the SWNT paste is left to dry under ambient conditions instead, surface area is lost and the dried material is difficult to re-disperse. The freeze-drying process is performed in a lyophilization apparatus that consists of a drying chamber with temperature controlled vials, a condenser to trap the water removed from the product, a cooling system, and a vacuum pump.

After the material is dried, the resulting Pt/SWNT product is calcined to decompose the metal precursor and then treated under hydrogen flow to reduce the Pt particles to the metallic state. One advantage of using this impregnation method (use of Pt precursors on nanotube paste) is the higher surface area and higher dispersions obtained compared to any other catalyst preparation method.

In this particular example, a certain amount of SWNT paste, with a concentration of nanotubes of around 10-30 mg of SWNT/ml of water, was prepared so as to have various batches containing at least 20 mg of SWNTs. The pH of each batch was adjusted to either 3 or 8, depending upon the Pt precursor, ($H_2PtCl_6$ (chloroplatinic acid) and $Pt(NH_3)_4(NO_3)_2$ (tetra-amonium platinic nitrate)). Once the pH had been adjusted, a volume of Pt precursor aqueous solution was added to the nanotube paste. The volume of added Pt solution was calculated to provide Pt contents of 10 and 30 wt. % respectively. The mixture was then sonicated with a horn dismembrator at high frequency and energy. Following the ion exchange process, the samples were freeze-dried first, and calcined in air at 300° C. for 2 hours. The Pt oxide was finally reduced in $H_2$ at 120° C. for one hour.

Depositions of as much as 30 wt. % Pt have been achieved herein with relatively high dispersions, as shown below. X-ray photoelectron spectroscopy analysis served to quantify the surface concentration of Pt deposited on the SWNTs a result of the particular impregnation method. The percentage of Pt found on the SWNT surface was in good agreement with the total amount of Pt incorporated to the mixture, meaning that the entire amount of Pt had deposited onto the nanotubes.

Results from X-ray Absorption Fine Structure Analysis (EXAFS) are shown in Table 1. Low coordination numbers (N) for the Pt—Pt bond were obtained for the SWNT-paste electrode support. However, when the Pt was deposited by the conventional incipient wetness method on dried SWNTs, the $N_{pt-Pt}$ increased substantially. Thus, the impregnation of the Pt was more effective towards higher dispersions using the new method contemplated herein.

TABLE 1

Structural parameters (inter-atomic distance, R, coordination number, $N_{pt-Pt}$, and Debye-Waller factor, $\sigma^2$) of the Pt particles supported on SWNTs as determined by EXAFS analysis.

| Pt incorporation method/Support | Pt load (wt %) | R(Å) | $N_{pt-Pt}$ | $\sigma^2$ (Å$^2$) |
|---|---|---|---|---|
| ion exchange/ SWNT-paste | 10 (amine precursor) | 2.77 | 5.85 | 0.0036 |
| | 30 (amine precursor) | 2.79 | 7.78 | 0.0027 |
| | 10 (amine precursor) | 2.77 | 4.40 | 0.0039 |
| Incipient wetness/ Dry powder | 10 (amine precursor) | 2.80 | 8.01 | 0.0027 |

Figure 2:
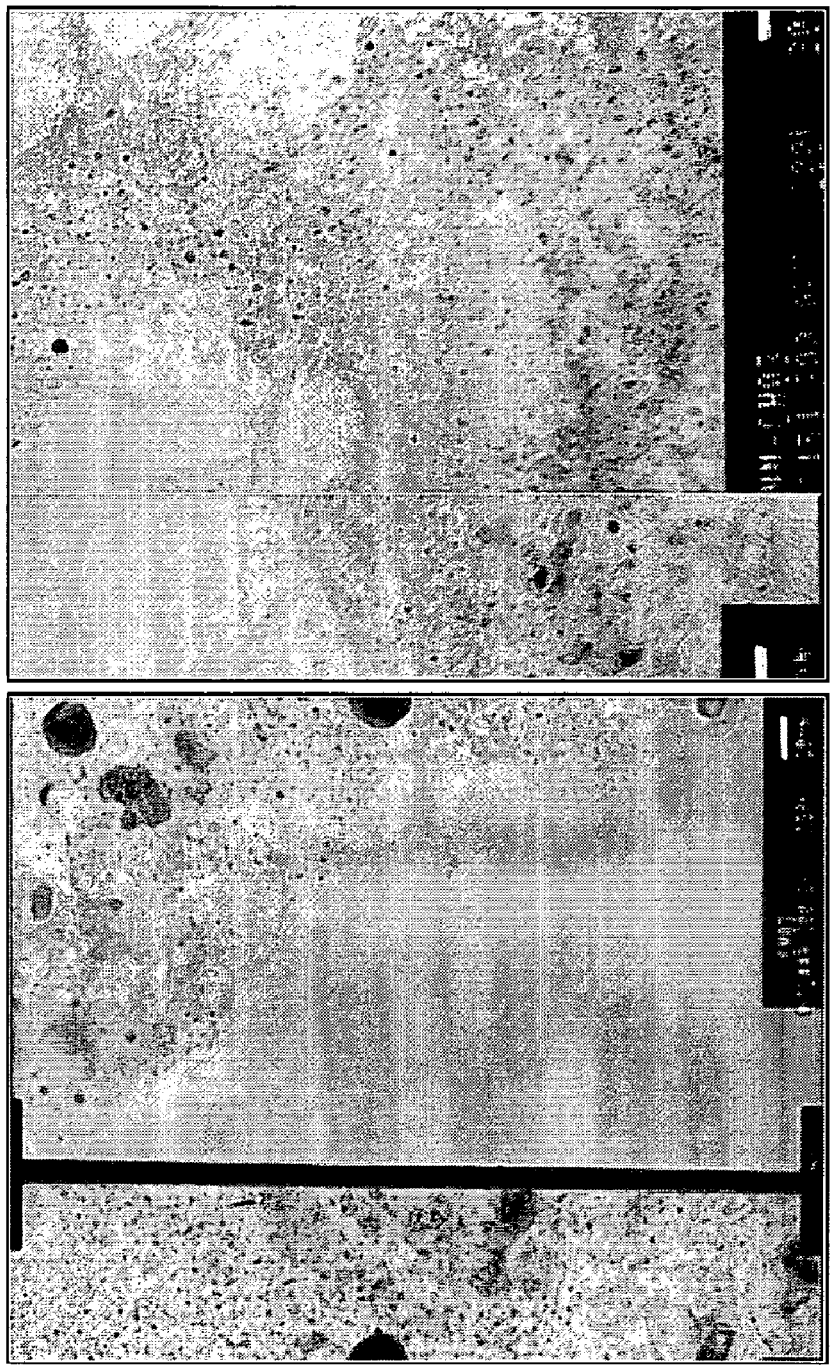
FIG. 2. TEM micrographs of Pt/SWNT specimens prepared from hexa-chloroplatinate. Pt loading=30 wt %. (The large particles in the image correspond to catalyst residue form the SWNT production).

FIGS. 1 and 2 show TEM micrographs of the SWNTs after the deposition of the Pt particles. The final material contains loadings of 10 wt. % and 30 wt. %, respectively with high dispersions in both cases. In the case of FIG. 1, particles as small as 1-2 nm are observed. Also, particles of the order of 5-10 nm in size have been dispersed over the pristine nanotubes. FIG. 2 shows that, even 30 wt. % of Pt loading, the particle size remains small and the dispersion is still very high.

To confirm that the present invention represents an improved method that can control the dispersion of the Pt particles by adjusting the pH of the medium appropriately, the effect of inverting the pH, prior to the addition of the precursor, was evaluated. By this comparison it was clearly demonstrated that when the nanotube surface exhibits the same electrical charge as the Pt salt precursors, a repulsion effect takes place, which results in larger Pt particle sizes and poor (low) dispersions. Low Pt dispersions are undesired for the effective functioning of a fuel cell electrode, cause a low utilization of Pt and increase the cost of the electrode.

Figure 3:
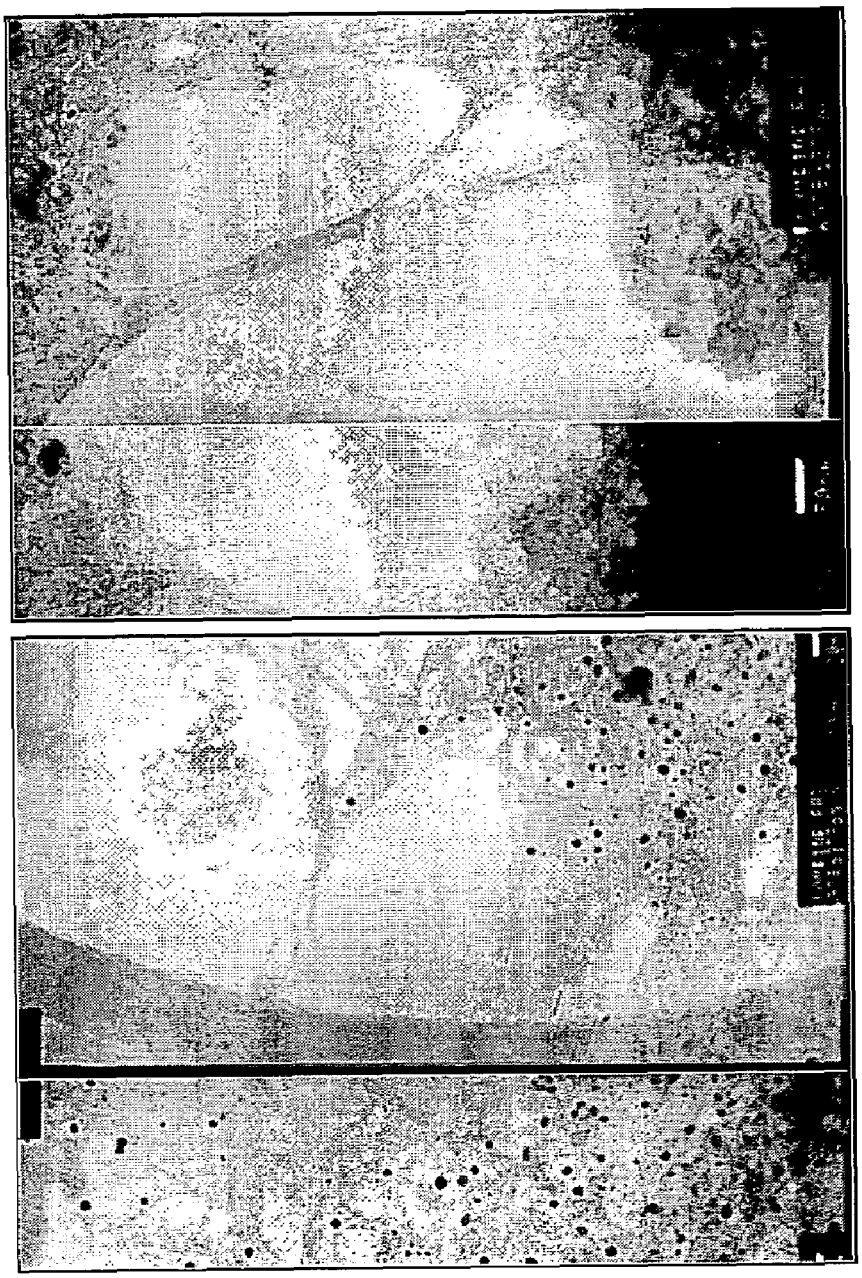
FIG. 3. TEM micrographs of Pt/SWNT specimens prepared from hexa-chloroplatinate at pH=8. Pt loading=10 wt %.

As shown in FIG. 3, a significant increase in the particle sizes occurred after the deposition of $PtCl_6^{2-}$ was carried at a basic pH, significantly above the PZC of the nanotubes. In addition to that, areas in which no Pt particles were present were also found.

Example 4

Preparation of Fuel Cell Electrodes

The preparation of fuel cell electrodes based on the Pt/SWNT pastes can be accomplished by at least two alternative methods discussed herein. In the first method, the Pt is impregnated on the SWNT paste following the method described in Example 3, above. The resulting catalyst material, which has the consistency of a thick ink, is freeze-dried to preserve the high surface area. The resulting material is calcined and reduced to obtain highly dispersed Pt particles over the SWNT support. The resulting Pt/SWNT solid must be resuspended before incorporating it onto the membrane fuel cell (PEM type). The Pt/SWNT catalyst suspension can be achieved by mixing the dry material the NMP (N-Methyl-2-Pyrrolidone).

To achieve a high operating efficiency, good mechanical and electrical contact between the catalyst material and the membrane is needed. To transfer a thin catalyst layer onto the membrane, the "decal" method can be employed. The decal is a layer of catalyst on a substrate such TEFLON. In this preparation method, a suspension containing the Pt/SWNT catalyst, an ionomer such as NAFION, and TEFLON is uniformly coated on the TEFLON substrate and left to dry slowly. After conditioning the membrane, the decal is transferred onto it and hot pressed between metal plates. The TEFLON backing layer is finally peeled off while the catalyst layer remains fixed on the membrane. The concentration of NAFION and TEFLON in the mix, the applied pressure, and the preconditioning of the membrane are operating parameters that can be optimized for each specific catalyst material using methods known by persons of ordinary skill in the art. The three-phase boundary (so called TPB) is the complex site where the electrode reaction occurs. The nature of this site is determined by the catalyst structure. The TPB length thus determines the electrocatalytic activity and can be optimized by controlling the metal particle size, the metal loading, and the amount of ionomer.

The ionomer is typically a solubilized form of the electrolyte membrane with or without addition of a binder such as TEFLON. By addition of ionomer over the catalyst the charge transfer interface can be extended from the membrane surface into the electrode structure. Alternatively, the catalystionomer mix will be directly incorporated over the membrane by the "paint" or "spray" methods. The deposition of the ionomer over the catalyst results from the suspension mix. In this suspension, the ionomer may be forming aggregates, whose size and morphology determine the thickness and three dimensional structure of the ionomer over the catalyst. This structure has an important impact on the transport of protons as well as gaseous reactants to and from the metal surface. Both the proton conduction as well as the diffusion of reactants and products through the ionomer layers which sometimes cover the metal particles can determine the overall fuel cell performance.

In a second method, the Pt is impregnated on the SWNT paste following the method described above, which results in a Pt/SWNT suspension with the consistency of a thick ink. As opposed to the first method, in this second method, the thick ink is directly painted onto the TEFLON substrate together with the NAFION ionomer and TEFLON, to conduct the same decal preparation method, as in the first method, but without going through the drying and Pt reduction steps. Therefore, the decomposition of the Pt precursor and the reduction steps have to be conducted on the decal during and subsequent to the hot-pressing step. If the hot pressing is conducted in air at a sufficient temperature (e.g., 150° C.), the decomposition of the Pt precursor can be accomplished in that step. Subsequently, the sample needs to be treated under hydrogen flow (e.g., about 135° C.) to effect the Pt reduction.

In other embodiments, other metals such as Pd, Ru, Ni and Li, for example, may also be added to the SWNT pastes via appropriate metal precursors to form other metal/SWNT catalysts or compositions.

Example 5

Viscosity Measurements of Dispersable SWNT Pastes in Aqueous Media

A series of SWNT pastes with concentrations of carbon nanotubes that varied from 1.4% to 2.7% in water were prepared following the method described in Example 1. The SWNTs purified according to the method described above were recovered in a glass container while still wet and additional deionized water was added to obtain the desired concentration of nanotubes. Very high-energy horn-sonication (using a Fisher 550 Sonic Dismembrator) was then applied to the solution for a few minutes until the preferred consistency of the paste was reached.

Rheology of a 2% SWNT Paste.

Figure 4:
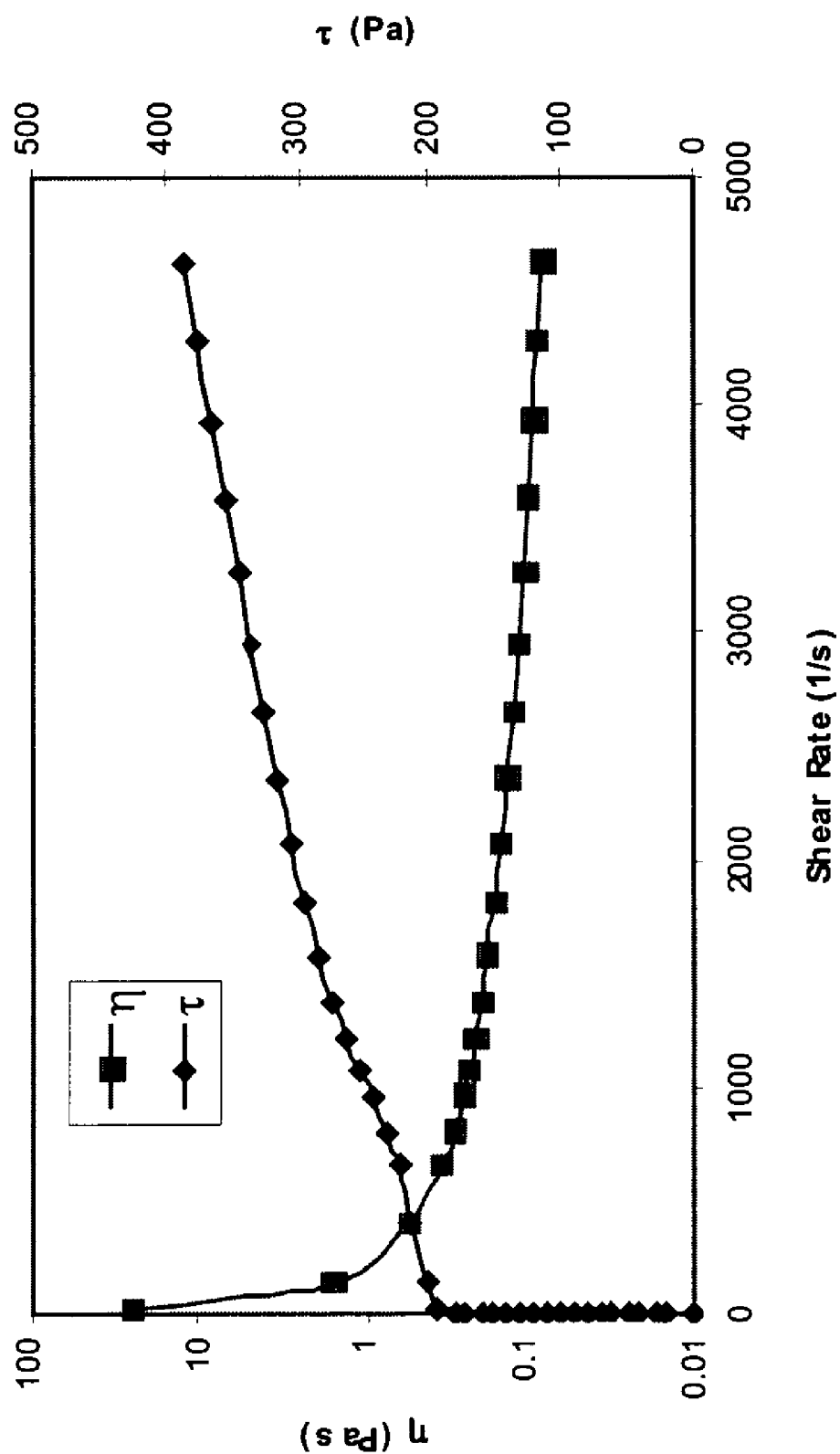
FIG. 4. Viscosity vs. Shear rate of a 2% SWNT paste in aqueous media at 25° C. Measured on a 25 mm cone and plate (cone angle=1°).
Figure 5:
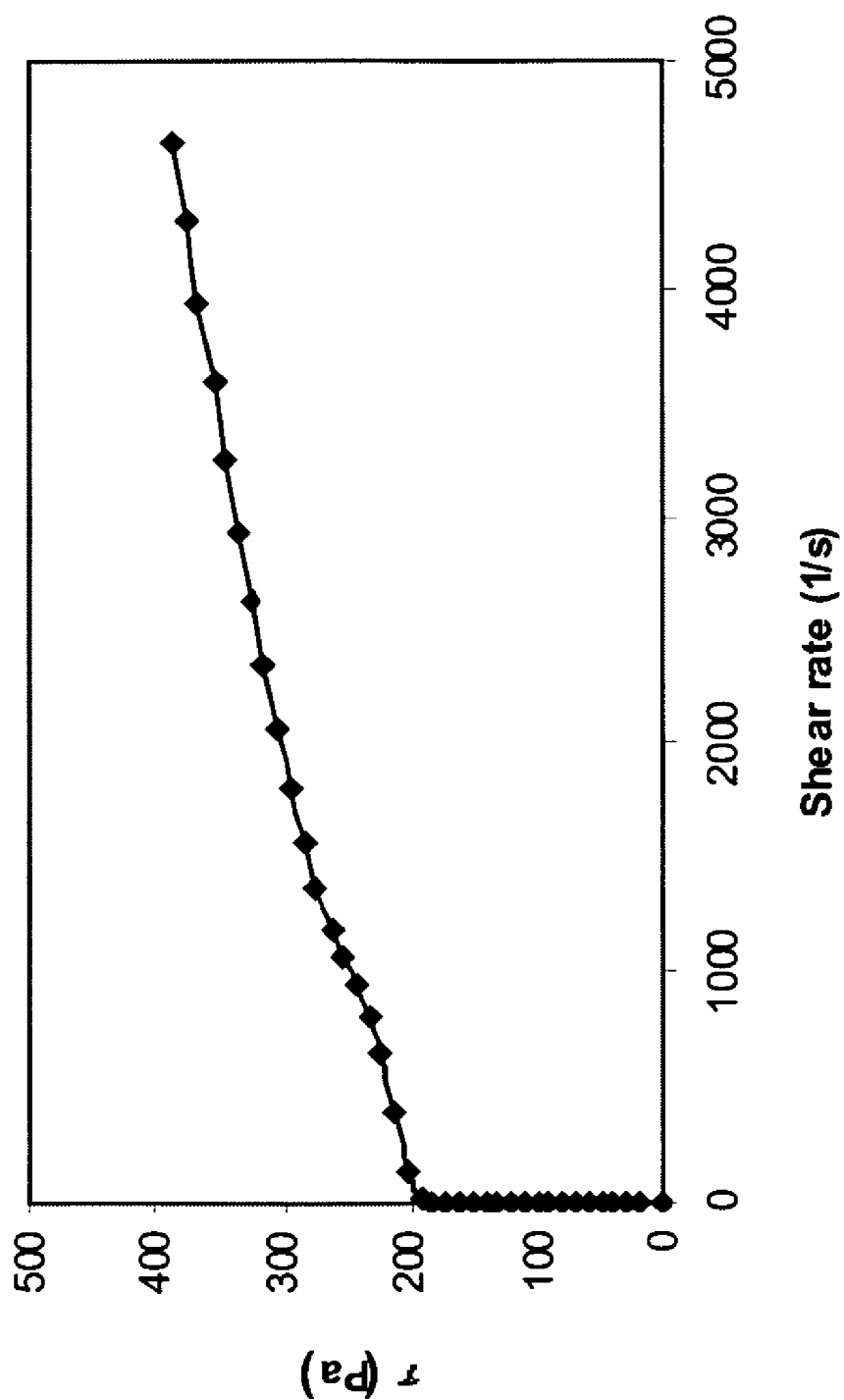
FIG. 5. Shear Stress vs. Shear rate of a 2% SWNT paste in aqueous media at 25° C.; stress ramp=0-600 Pa; total time=60 seconds (at 1 second intervals).

A few milliliters of a 2% SWNT paste were tested using a Brookfield R/S CPS P1 Rheometer with cone and plate (25 mm diameter, 1° cone angle) at 25° C. The test results were generated using a stress ramp from 0 to 600 Pa. Readings were taken over 60 seconds, at 1 second intervals. A total of eight tests were performed for reproducibility. FIG. 4 shows the viscosity and the shear stress as a function of the shear rate. It is interesting to note that a nanotube content of only 2% (98%) water in the SWNT paste, introduces an increase in the viscosity of water of 40,000 times in the low shear rate region (~40,000 cp at 10 s$^{-1}$). The shapes of the curves show the classical non-Newtonian, shear thinning behavior that is, the viscosity decreases when the shear rate increases. In addition, based on observations at constant shear rate, the SWNT paste appears slightly thixotropic, that is, the viscosity is time dependent. A data plot of the shear stress vs. the shear rate is presented in FIG. 5. The SWNT paste follows a Herschel-Bulkley (HB) model, a modification of the Bingham model for plastic fluids. Bingham plastics are characterized by a non-zero shear stress when the shear rate is zero. Th Herschel-Bulkley model combines the effects of Bingham and power-law behavior in a fluid, as shown in equation (1):

$$\tau = \tau_0 + A \cdot \gamma^b \qquad (1)$$

Where $\tau_0$ is the HB yield stress, A is the HB plastic viscosity and b is the HB yield exponent. When $\tau < \tau_0$ the material remains rigid. For $\tau > \tau_0$ the material flows as a power-law fluid. A Bingham fluid exhibits a value of b=1. The fitting parameters obtained for the model are presented in Table 2. In this case, b=0.72 (b<1) which deviates from the typical Bingham plastic and corresponds to a shear-thinning Herschel-Bulkley model. This SWNT paste is Theologically similar to a variety of medium viscosity foods (sauces, salad dressings) and personal care product (lotions), which makes it suitable material for a variety of applications, such as coatings and paints.

Comparison of the Rheological Behaviors of 1.4%, 2% and 2.7% SWNT Pastes.

Figure 6:
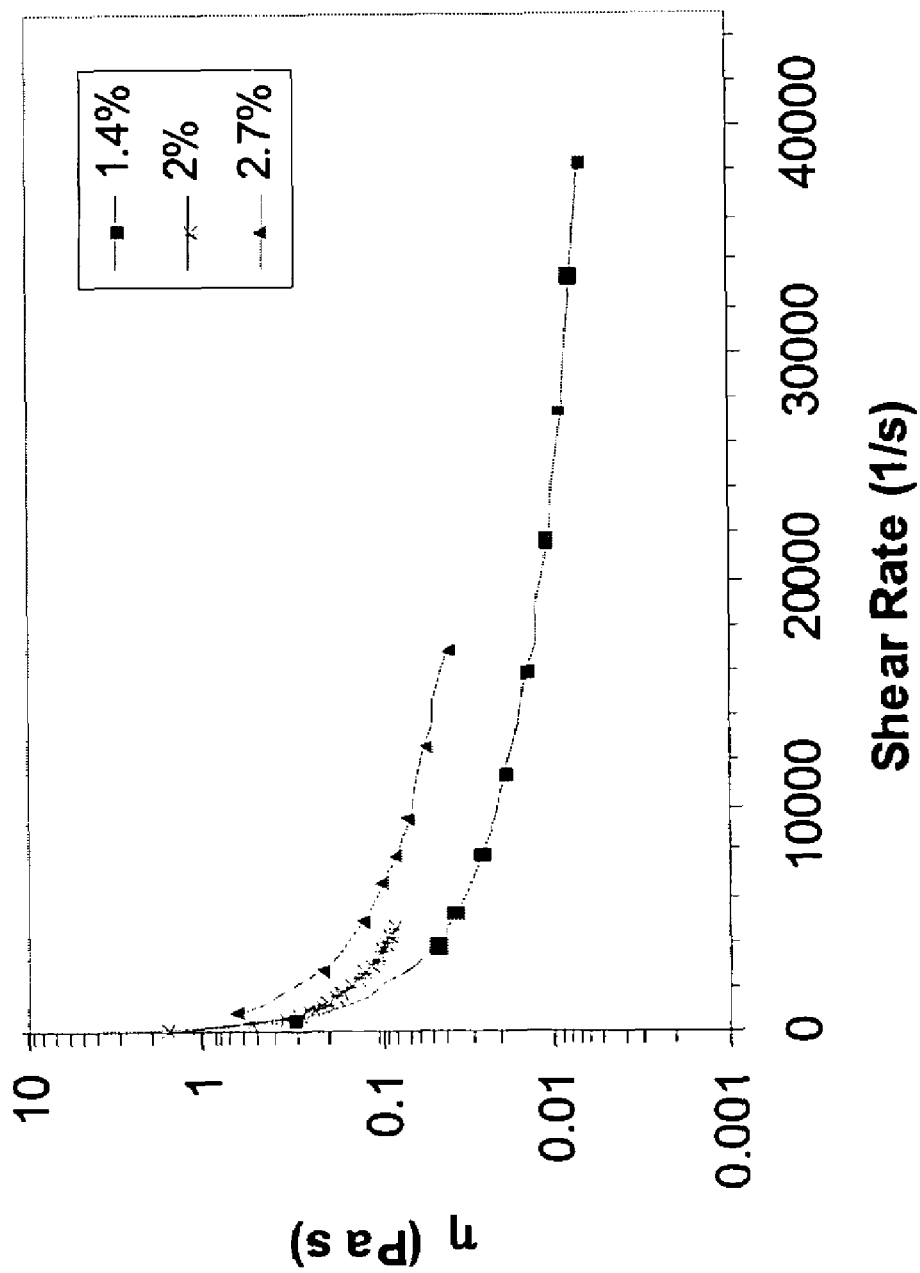
FIG. 6. Viscosity vs. Shear rate of various SWNT pastes in aqueous media at 25° C., measured on a 25 mm cone and plate (cone angle=1°).

A few milliliters of each paste were tested making use of the same rheometer described above at 25° C. The test results were generated under steady state mode with stress controlled. Depending on the amount of sample available, several tests of the same sample were performed for reproducibility. FIG. 6 compares the viscosities of three different SWNT pastes under the effect of the shear rate. As expected, the viscosity of the paste increases with the concentration of nanotubes. It is important to note that significant viscosity changes occur with very small variations in the nanotube concentration, which indicates that this characterization technique is very sensitive to small changes. Take, for example, the viscosity values of the three pastes at 5000 s$^{-1}$. The values of $\eta$ are 40 cp, 80 cp, and 150 cp for the 1.4%, 2% and 2.7% pastes, respectively. Again, the viscosities of the pastes decrease with the shear rate indicating a shear thinning behavior.

Figure 7:
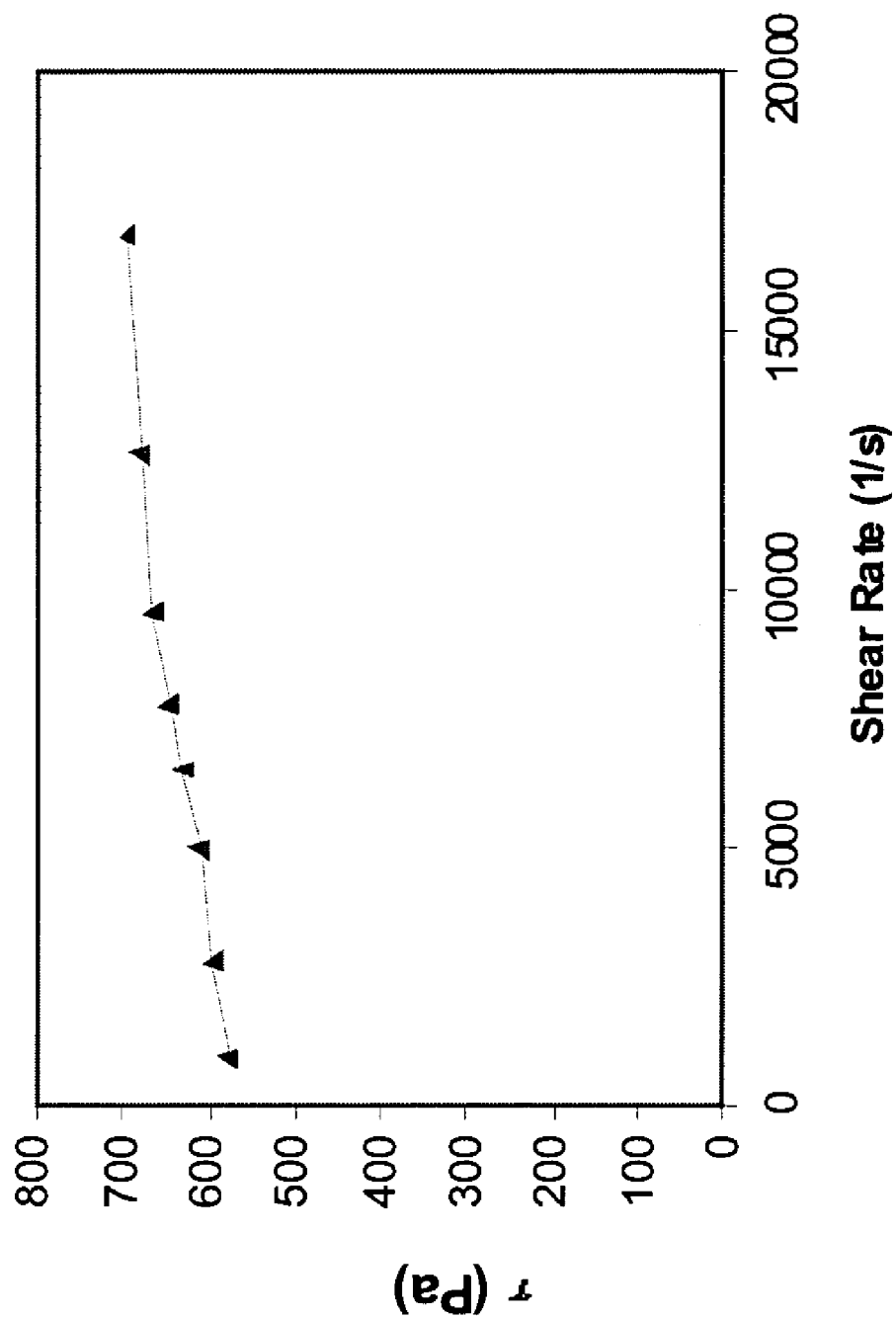
FIG. 7. Shear vs. Shear rate of a 2.7% SWNT paste in aqueous medium at 25° C.; steady state mode, stress controlled.

Values of the shear stress vs. shear rates for various SWNT pastes were also obtained. For example, the yield stress ($\tau_0$) of a 2.7% paste was found to be 576.27 Pa, with a Herschel-Bulkley behavior evident from the shape of the curve in FIG. 7. The regression parameters were A=0.173 and b=0.674 (b<1). As the concentration of nanotubes was reduced, the yield stress of the SWNT pastes decreased with consistency. Thus, the $\tau_0$ values of these SWNT pastes in aqueous media ranged from around 100 to 600 Pa.

TABLE 2

Analysis results according to the Herschel-Bulkley model of a SWNT paste with 2% nanotubes in aqueous medium.

| $\tau_0$ (Pa) | A (Pa•s) | b |
|---|---|---|
| 184.74 | 0.4553 | 0.7244 |

* Regression parameters: B = 0.9928, S = 5.27

In one embodiment, the SWNT paste has a viscosity of 0.001 Pa.sec to 1000 Pa.sec, wherein the shear rate range is 1000/sec to 10,000/sec, and the nanotube concentration ranges from 0.1 wt % to 3 wt %. In another embodiment, the SWNT paste has a viscosity of 0.1 Pa.sec to 10 Pa.sec, wherein the shear rate range is 1000/sec to 4000/sec and the nanotube concentration ranges from 1 wt % to 3 wt %.

Figure 8:
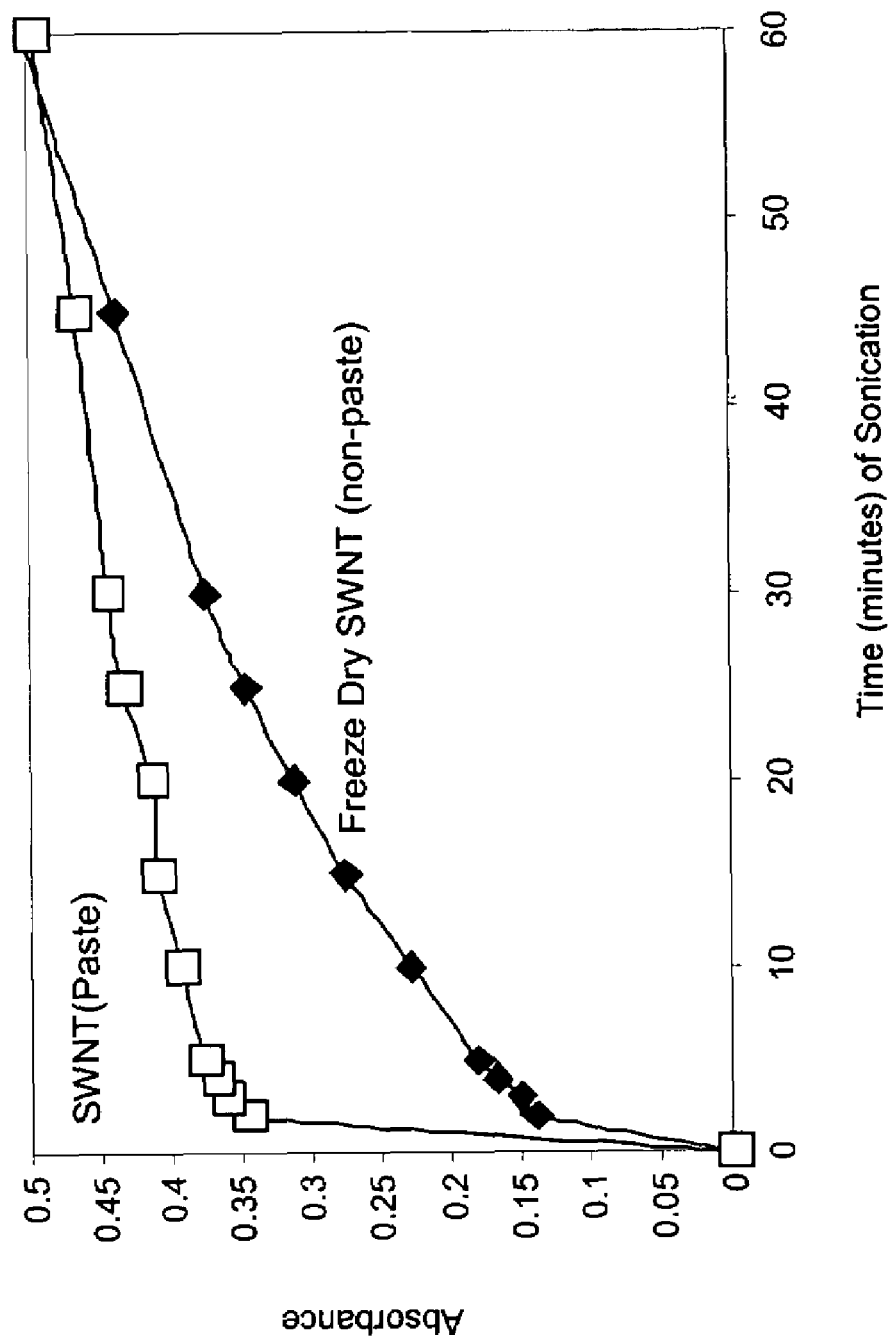
FIG. 8 is a graph showing the relationship of sonication time vs. absorbance for wet SWNT paste and non-paste freeze dried SWNTs.

One of the most remarkable characteristics of the SWNT paste (gel) of the present invention is the ease with which it dissolves in water after a few minutes of sonication. FIG. 8 compares the rate of redispersion of a non-paste sample of nanotubes which has been freeze-dried with redispersion of the SWNT paste of the present invention as measured by the optical absorption at an 800 nm wavelength. Absorption increases with the presence of nanotubes dispersed in the water. The difference in the rate of absorption increase is remarkable. In 2 minutes of sonication of the SWNT paste, the absorbance is already that obtained after 25 minutes of sonication of the freeze dried SWNT sample due to greater nanotube dispersion of the SWNT paste. Shortening the sonication time to reach a given nanotube dispersion not only has economic advantages in terms of time and cost of the operation, but it also minimizes the potential damage to the nanotubes caused by the severe mechanical shaking during the high-energy sonication.

In one embodiment the present invention contemplated herein comprises a method of producing a carbon nanotube dispersion, comprising the steps of providing a quantity of single-walled carbon nanotubes having a wet condition, combining the single-walled carbon nanotubes with a solvent to form a nanotube-solvent mixture, and sonicating the nanotube-solvent mixture at a high frequency until the sonicated mixture comprises a super saturated mixture of the nanotubes and the solvent which comprises the carbon nanotube dispersion, wherein the carbon nanotube dispersion has a thicker viscosity than the nanotube-solvent mixture before sonication. The high frequency may be at least 20 KHz. The solvent may be water or an organic solvent, for example. The viscosity of the carbon nanotube dispersion may be from 0.001 Pa.sec to 1000 Pa.sec, or from 0.1 Pa.sec to 10 Pa.sec, for example. The invention further comprises a carbon nanotube dispersion produced by any one of these methods and/or a carbon nanotube product comprising a carbon nanotube dispersion as described herein after the carbon nanotube dispersion has been freeze-dried.

The present invention further comprises a method of producing a metal-carbon nanotube paste, comprising providing a quantity of a carbon nanotube dispersion comprising single-walled carbon nanotubes dispersed in a solvent and having a paste-like consistency, combining and, mixing the carbon nanotube dispersion with a metal precursor solution forming a nanotube-metal precursor mixture, and sonicating the nanotube-metal precursor mixture to enhance the diffusion and adsorption of metal ions of the metal precursor onto the carbon nanotubes forming the metal-carbon nanotube paste. In the method the metal precursor may comprise, for example, at least one of platinum, palladium, ruthenium, nickle or lithium. The method may comprise the additional step of freeze-drying the metal-carbon nanotube paste. The method may comprise the step of calcining the freeze dried metal-carbon nanotube paste. The method may comprise the step of adjusting the pH of the nanotubes of the carbon nanotube dispersion to have a charge which is opposite to a charge of a metal ion of the metal precursor solution. The method may comprise the additional step of reducing the metal ion of the metal precursor. The present invention may comprise a metal carbon nanotube paste produced by any method shown herein. The present invention may comprise a fuel cell electrode comprising the metal-carbon nanotube paste produced by any method shown herein. The fuel cell electrode may comprise, for example, a metal precursor which is a precursor of platinum, palladium, ruthenium, nickle, or lithium.

The present invention may comprise a method of producing a Pt-carbon nanotube paste, comprising the steps of providing a quantity of an carbon nanotube dispersion comprising single-walled carbon nanotubes dispersed in a solvent and having a paste-like consistency, combining and mixing the carbon nanotube dispersion with a Pt precursor solution forming a nanotube-Pt precursor mixture, and sonicating the nanotube-Pt precursor mixture to enhance the diffusion and adsorption of Pt ions of the Pt precursor onto the carbon nanotubes forming the Pt-carbon nanotube paste. The method may comprise the additional step of freeze-drying the Pt-carbon nanotube paste. The method may comprise the step of calcining the freeze dried Pt-carbon nanotube paste. The method may comprise the step of adjusting the pH of the nanotubes of the carbon nanotube dispersion to have a charge which is opposite to a charge of the Pt ion of the Pt precursor solution. The method may comprise the additional step of reducing the Pt ion of carbon nanotube paste. The invention may comprise a Pt carbon nanotube paste produced by any method shown herein. The invention may comprise a fuel cell electrode comprising the Pt-carbon nanotube paste produced by any method shown herein.

The present invention further comprises a carbon nanotube dispersion comprising single-walled carbon nanotubes dispersed in a solvent and having a paste-like consistency, and wherein when the carbon nanotube dispersion is combined with a surfactant solution and sonicated with a horn sonicator at 500-750 W provides, after 5 minutes of sonication, a resuspension of the single-walled carbon nanotubes in the surfactant solution of at least 50% of a maximum attainable resuspension of the single-walled carbon nanotubes in the surfactant solution, wherein the resuspension is measured by optical absorption at a wavelength of 800-900 nm.

The invention further comprises a method of providing a single-walled carbon nanotube resuspension comprising providing a carbon nanotube dispersion comprising single-walled carbon nanotubes dispersed in a solvent and having a paste-like consistency, combining the carbon nanotube dispersion with a surfactant solution to make a nanotube-surfactant mixture, and sonicating the nanotube-surfactant mixture with a horn sonicator at 500-750 W wherein, after 5 minutes of sonication, a resuspension of the single-walled carbon nanotubes in the nanotube-surfactant mixture has at least 50% of a maximum attainable resuspension of the single-walled carbon nanotubes in the nanotube-surfactant mixture, wherein the resuspension of the single-walled carbon nanotubes is measured by optical absorption at a wavelength of 800-900 nm.

The present invention is not to be limited in scope by the specific embodiments described herein, since such embodiments are intended as but single illustrations of one aspect of the invention and any functionally equivalent embodiments are within the scope of this invention. Indeed, various modifications of the methods of the invention in addition to those shown and described herein will become apparent to those skilled in the art form the foregoing description.

Each of the references, patents or publications cited herein is hereby expressly incorporated herein by reference in its entirety.

CITED REFERENCES

1. Harutyunyan, Avetik; Pradhan, Bhabendra K.; Eklund, Peter C.; U.S. Published Patent Application 2003/0042128.
2. Smalley, Richard E.; Colbert, Daniel T.; Guo, Ting; Rinzler, Andrew G.; Nikolaev, Pavel; Thess, Andreas; U.S. Pat. No. 6,183,714 (2001).

3. J. Liu, A. G. Rinzler, H. Dai, J. H. Hafner, R. K. Bradley, P. J. Boul, A. Lu, T. Iverson, K. Shelimov, C. B. Huffman, F. Rodriguez-Macias, Y. S. Shon, T. R. Lee, D. T. Colbert, R. E. Smalley, *Science* 280 (1998) 1253.
4. J. Zhang, H. Zou, Q. Qing, Y. Yang, Q. Li, Z. Liu, X. Guo, Z. Du, *J. Phys. Chem. B* 107(16) (2003) 3712.
5. Haddon, Robert C.; Chen, Jian. U.S. Pat. No. 6,187,823 (2001).
6. E. T. Mickelson, I. W. Chiang, J. L. Zimmerman, P. J. Boul, 3. Lozano, J. Liu, R. E. Smalley, R. H. Hauge, J. L. Margrave, *J. Phys. Chem. B* 103 (1999) 4318.
7. P. J. Boul, J. Liu, E. T. Mickelson, C. B. Huffman, L. M. Ericson, I. W. Chiang, K. A. Smith, D. T. Colbert, R. H. Hauge, J. L. Margrave, R. E. Smalley, *Chem. Phys. Lett.* 310 (1999) 367.
8. J. L. Bahr, J. Yang, D. V. Kosynkin, M. J. Bronikowski, R. E. Smalley, and 3. M. Tour, *J. Am. Chem. Soc.*, 123 (2001) 6536.
9. J. L. Bahr, J. Yang, D. V. Kosynkin, M. J. Bronikowski, R. E. Smalley, J. M. Tour, *J. Am. Chem. Soc.*, 123 (2001) 6536.
10. J. Chen, A. M. Rao, S. Lyuksyutov, M. E. Itkis, M. A. Hamon, R. W. Cohn, P. C. Eklund, D. T. Colbert, R. E. Smalley, R. C. Haddon, *J. Phys. Chem. B* 105 (2001) 2525.
11. J. E. Riggs, D. B. Walker, D. L. Carrl, Y-P. Sun, *J. Phys. Chem. B* 104 (2000) 7071.
12. M. O'Connell, P. Boul, L. M. Ericson, C. Huffman, Y. Wang, E. Haroz, C. Kuper, J. Tour, K. Ausman, R. E. Smalley, *Chem. Phys. Lett.* 342, 265 (2001) 265.
13. Chen, Jian; Liu, Haiying. Polymer and using the polymer for noncovalently functionalizing nanotubes. Eur. Pat. Appl. (2003), 22 pp. CODEN: EPXXDW EP 1359169 A2 20031105 CAN 139:338658 AN 2003:872366.
14. Chen, Jian. Polymer and using the polymer for solubilizing nanotubes. Eur. Pat. Appl. (2003), 23 pp. CODEN: EPXXDW EP 1359121 A2 20031105 CAN 139:338657 AN 2003:872360.
15. Chen, Jian; Liu, Haiying; Weimer, Wayne A.; Halls, Mathew D.; Waldeck, David H.; Walker, Gilbert C. *Journal of the American Chemical Society* (2002), 124(31), 9034-9035.
16. Strano, Michael S.; Moore, Valerie C.; Miller, Michael K.; Allen, Mathew J.; Haroz, Erik H.; Kittrell, Carter; Hauge, Robert H.; Smalley, R. E., *J. Nanoscience and Nanotechnology* (2003), 3(1/2), 81-86.
17. Moore, Valerie C.; Strano, Michael S.; Haroz, Erik H.; Hauge, Robert H.; Smalley, Richard E.; Schmidt, Judith; Talmon, Yeshayahu. Individually Suspended Single-Walled Carbon Nanotubes in Various Surfactants. *Nano Letters* (2003), 3(10), 1379-1382.
18. M. F. Islam, E. Rojas, D. M. Bergey, A. T. Johnson, A. G. Yodh, *Nano Lett.* 3(2) (2003) 269.
19. Matarredona, Olga; Rhoads, Heather; Li, Zhongrui; Harwell, Jeffrey H.; Balzano, Leandro; Resasco, Daniel E., *J. Physical Chem.* (2003), 107 (48) 13357.
20. Smalley, Richard E.; Saini, Rajesh Kumar; Sivarajan, Ramesh; Hauge, Robert H.; Davis, Virginia A.; Pasquali, Matteo; Ericson, Lars Martin; Kumar, Satish; Veedu, Sreekumar Thaliyil; U.S. Published patent application No. 2003/0133865 (2003).
21. V. Lordi, N. Yao, J. Wei, *Chem. Mater.* 13 (2001) 733.
22. W. Li, S. Liang, W. Zhou, J. Qiu, Z. Zhou, G. Sun, Q. Xin, *J. Phys. Chem. B* 107 (2003) 6292.
23. A. Govindaraj, B. C. Satishkumar, M. Nath, C. N. R. Rao, *Chem. Mater.* 12 (2000) 202.
24. D. E. Resasco, B. Kitiyanan, J. H. Harwell, W. Alvarez. U.S. Pat. No. 6,333,016 (2001).
25. D. E Resasco, L. Balzano, W. Alvarez, B. Kitiyanan, U.S. Pat. No. 6,413,487 (2002).
26. Herrera, J. E.; Balzano, L.; Borgna, A.; Alvarez, W. E.; Resasco, D. E. *J. Catal.*, 204 (2001) 129.
27. Alvarez, W. E.; Pompeo, F.; Herrera, J. E.; Balzano, L.; Resasco, D. E. *Chem. Mater.*, 14 (2002)1853.
28. J. E. Herrera, L. Balzano, F. Pompeo, and D. E. Resasco. *Journal of Nanoscience and Nanotechnology* (2003), 3, 133-138.
29. M. Wilson and C. Zawodzinski; U.S. Pat. No. 5,798,187 (1998).

What is claimed is:

1. A method of producing a carbon nanotube dispersion, comprising:
providing a quantity of non-functionalized single-walled carbon nanotubes having a wet condition;
combining the non-functionalized single-walled carbon nanotubes with water to form a nanotube-water mixture comprising 2% (by weight) or greater of non-functionalized single-walled carbon nanotubes wherein the nanotube-water mixture lacks additives or external chemical agents; and
sonicating the nanotube-water mixture at a high frequency until the sonicated mixture comprises a mixture of the nanotubes and the water which comprises the carbon nanotube dispersion, wherein the carbon nanotube dispersion has a viscosity of at least 0.111 Pa.sec at a shear rate of $\leq 3657$ s$^{-1}$.

2. The method of claim 1 wherein the high frequency is at least 20 KHz.

3. A carbon nanotube dispersion produced by the method of claim 1.

4. A method of producing a metal-carbon nanotube paste, comprising:
providing a quantity of a carbon nanotube dispersion comprising 2% (by weight) or greater of non-functionalized single-walled carbon nanotubes dispersed in water wherein the carbon nanotube dispersion lacks additives or external chemical agents and has a viscosity of at least. 0.111 Pa.sec at a shear rate of $\leq 3657$ s$^{-1}$;
combining and mixing the carbon nanotube dispersion with a metal precursor solution forming a nanotube-metal precursor mixture; and
sonicating the nanotube-metal precursor mixture to enhance the diffusion and adsorption of metal ions of the metal precursor onto the carbon nanotubes forming the metal-carbon nanotube paste.

5. The method of claim 4 wherein the metal precursor comprises at least one of platinum, palladium, ruthenium, nickle or lithium.

6. The method of claim 4 comprising the additional step of freeze-drying the metal-carbon nanotube paste.

7. The method of claim 6 comprising the step of calcining the freeze dried metal-carbon nanotube paste.

8. The method of claim 4 comprising the step of adjusting the pH of the nanotubes of the carbon nanotube dispersion to have a charge which is opposite to a charge of a metal ion of the metal precursor solution.

9. The method of claim 4 comprising the additional step of reducing the metal ion of the metal precursor.

10. The metal carbon nanotube paste produced by the method of claim 4.

11. A fuel cell electrode comprising the metal-carbon nanotube paste produced by the method of claim 4.

12. The fuel cell electrode of claim 11 wherein the metal precursor is a precursor of platinum, palladium, ruthenium, nickle, or lithium.

13. A method of producing a Pt-carbon nanotube paste, comprising:

providing a quantity of an carbon nanotube dispersion comprising 2% (by weight) or greater of non-functionalized single-walled carbon nanotubes dispersed in water wherein the carbon nanotube dispersion lacks additives or external chemical agents and has a viscosity of at least 0.111 Pa.sec at a shear rate of $\leq 3657$ s$^{-1}$;

combining and mixing the carbon nanotube dispersion with a Pt precursor solution forming a nanotube-Pt precursor mixture; and sonicating the nanotube-Pt precursor mixture to enhance the diffusion and adsorption of Pt ions of the Pt precursor onto the carbon nanotubes forming the Pt-carbon nanotube paste.

14. The method of claim 13 comprising the additional step of freeze-drying the Pt-carbon nanotube paste.

15. The method of claim 14 comprising the step of calcining the freeze dried Pt-carbon nanotube paste.

16. The method of claim 13 comprising the step of adjusting the pH of the nanotubes of the carbon nanotube dispersion to have a charge which is opposite to a charge of the Pt ion of the Pt precursor solution.

17. The method of claim 13 comprising the additional step of reducing the Pt ion of carbon nanotube paste.

18. The Pt carbon nanotube paste produced by the method of claim 13.

19. A fuel cell electrode comprising the Pt-carbon nanotube paste produced by the method of claim 13.

* * * * *

UNITED STATES PATENT AND TRADEMARK OFFICE
CERTIFICATE OF CORRECTION

PATENT NO. : 7,279,247 B2
APPLICATION NO. : 10/989124
DATED : October 9, 2007
INVENTOR(S) : Olga Matarredona et al.

It is certified that error appears in the above-identified patent and that said Letters Patent is hereby corrected as shown below:

In the Specification:
Column 10, line 14: Delete "Theologically" and replace with -- rheologically --.

Column 13, line 10: After "Boul," delete "3." and replace with -- J. --.
Column 13, line 17: After "and" delete "3." and replace with -- J. --.

Signed and Sealed this

Eighth Day of April, 2008

JON W. DUDAS
*Director of the United States Patent and Trademark Office*